(12) United States Patent
Dubal et al.

(10) Patent No.: US 8,346,999 B2
(45) Date of Patent: Jan. 1, 2013

(54) DYNAMIC RECEIVE QUEUE BALANCING WITH HIGH AND LOW THRESHOLDS

(75) Inventors: Scott P. Dubal, Beaverton, OR (US);
Patrick Connor, Beaverton, OR (US);
Mallikarjuna R. Chilakala, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 12/638,538

(22) Filed: Dec. 15, 2009

(65) Prior Publication Data

US 2011/0142064 A1 Jun. 16, 2011

(51) Int. Cl.
*G06F 3/00* (2006.01)
*G06F 11/00* (2006.01)
(52) U.S. Cl. .............................. 710/52; 370/229; 710/57
(58) Field of Classification Search .................. 370/229, 370/235, 236, 237, 351, 389, 395.71, 412; 710/1, 52–58
See application file for complete search history.

(56) References Cited

U.S. PATENT DOCUMENTS

| 6,625,161 B1* | 9/2003 | Su et al. ....................... 370/415 |
| 7,548,513 B2* | 6/2009 | Tran ............................. 370/235 |
| 7,584,286 B2 | 9/2009 | Goglin et al. |
| 2009/0006521 A1 | 1/2009 | Veal et al. |
| 2011/0069750 A1* | 3/2011 | Chengalvala et al. ... 375/240.02 |

* cited by examiner

*Primary Examiner* — Chun-Kuan Lee
*Assistant Examiner* — Richard B Franklin
(74) *Attorney, Agent, or Firm* — Grossman, Tucker, Perreault & Pfleger, PLLC (57) ABSTRACT

A method according to one embodiment includes the operations of assigning a network application to at least one first core processing unit, from among a plurality of core processing unit. The method of this embodiment also includes the operations of assigning a first receive queue to said first core processing unit, wherein the first receive queue is configured to receive packet flow associated with the network application; defining a high threshold for the first receive queue; and monitoring the packet flow in the first receive queue and comparing a packet flow level in the first receive queue to the high threshold; wherein if the packet flow level exceeds the threshold based on the comparing, generating a queue status message indicating that the packet flow level in the first queue has exceeded the queue high threshold.

12 Claims, 7 Drawing Sheets

| Hash Index | Queue | Core |
|---|---|---|
| $h_0$ | $Queue_A$ | $CPU_A$ |
| $h_1$ | Queue | CPU |
| $h_2$ | $Queue_B$ | $CPU_B$ |
| ⋮ | ⋮ | ⋮ |
| $h_k$ | $Queue_A$ | $CPU_A$ |

DYNAMIC RECEIVE QUEUE BALANCING WITH HIGH AND LOW THRESHOLDS

FIELD

The disclosure relates to packet load balancing and, more particularly, to dynamic receive queue balancing.

BACKGROUND

As network speeds increase, it becomes necessary to scale packet processing across multiple processors in a system. For receive processing, a feature called RSS (Receive Side Scaling) can distribute incoming packets across multiple processors in a system. RSS is a Microsoft® Windows® operating system ("OS") technology that enables receive-processing to scale with the number of available computer processors by allowing the network load from a network controller to be balanced across multiple processors. RSS is described in "Scalable Networking: Eliminating the Receive Processing Bottleneck—Introducing RSS", WinHEC (Windows Hardware Engineering Conference) 2004, Apr. 14, 2004 (hereinafter "the WinHEC Apr. 14, 2004 white paper"). It is also described in the Scalable Network Pack of the Network Driver Interface Specification (NDIS). NDIS describes a Microsoft Windows device driver that enables a single network controller, such as a NIC (network interface connection), to support multiple network protocols, or that enables multiple network controllers to support multiple network protocols. The current version of NDIS is NDIS 6.2, and is available from Microsoft® Corporation of Redmond, Wash. The subsequent version of NDIS, known as NDIS 6.2, available from Microsoft Corporation, is currently known as the "Scalable Networking Pack" for Windows Server 2003. With the RSS feature, the OS distributes the processing load for network traffic across multiple processors, cores, or hardware threads by maintaining an indirection table in the network device that maps flows to the processing unit.

On the network device side of packet flow processing, so-called "application targeted routing" (ATR) can be used to assign a network application to a specific MAC receive queue and processor core. Once the queue/core pair is assigned, ATR logic (residing in the MAC) can be used to track TCP/IP and/or UDP packet flows and post packets to the correct queue/core pair. However, an overloaded CPU or excessive packet offloading (for example, security offloading using IPSec or LinkSec protocols) may cause the receive queue to become overloaded. Conventional implementations of ATR do not account for load conditions on the MAC queues, and thus, an overloaded queue may result in packet loss and/or performance degradation.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

RSS and ATR techniques may be used to take advantage of multiple cores to more efficiently process packet flows, however these techniques may suffer from decreased performance due to a failure to react to packet flow at the receive queues. For example, a network MAC may include ATR logic to load incoming packets to a particular MAC queue based an application-specific filter properties. However, as a result of not being emptied by the application side and/or burst traffic on the network adaptor side, packets may be dropped as queues become overloaded. Generally, this disclosure describes systems (and methods) of setting thresholds for receive queues, and monitoring the packet flow in the queues with respect to the thresholds. As queue capacity exceeds a threshold, a messaging system is provided herein that notifies an operating system of an impending queue overload condition. In response to this message, the operating system may assign the application (associated with the troubled queue) to a new core, and the application may also be reassigned to a new receive queue. Moving a packet flow away from an overloaded queue may reduce or eliminate dropped packets in the network adapter and/or network adapter packet flow inefficiencies.

While the receive queues can be located at the network adapter or defined within host system memory (or elsewhere), there are a number of advantages of monitoring and reacting to queue conditions at the network adaptor. For instance, the network adaptor may generally reference the receive queues more frequently than the host, and therefore be able to detect and react to a queue overload condition more quickly than, for example, a software module running in host memory. Further, the network adapter is generally better suited to monitor the queue levels during the frequent intervals when packets are being added, rather than the relatively infrequent intervals when the receive queues are emptied. Because the network adaptor is already servicing the queues more frequently, it may be less overhead for the network adaptor to add queue monitoring to its existing service schedule than to increase the queue service schedule of the host system.

System Architecture

Figure 1:
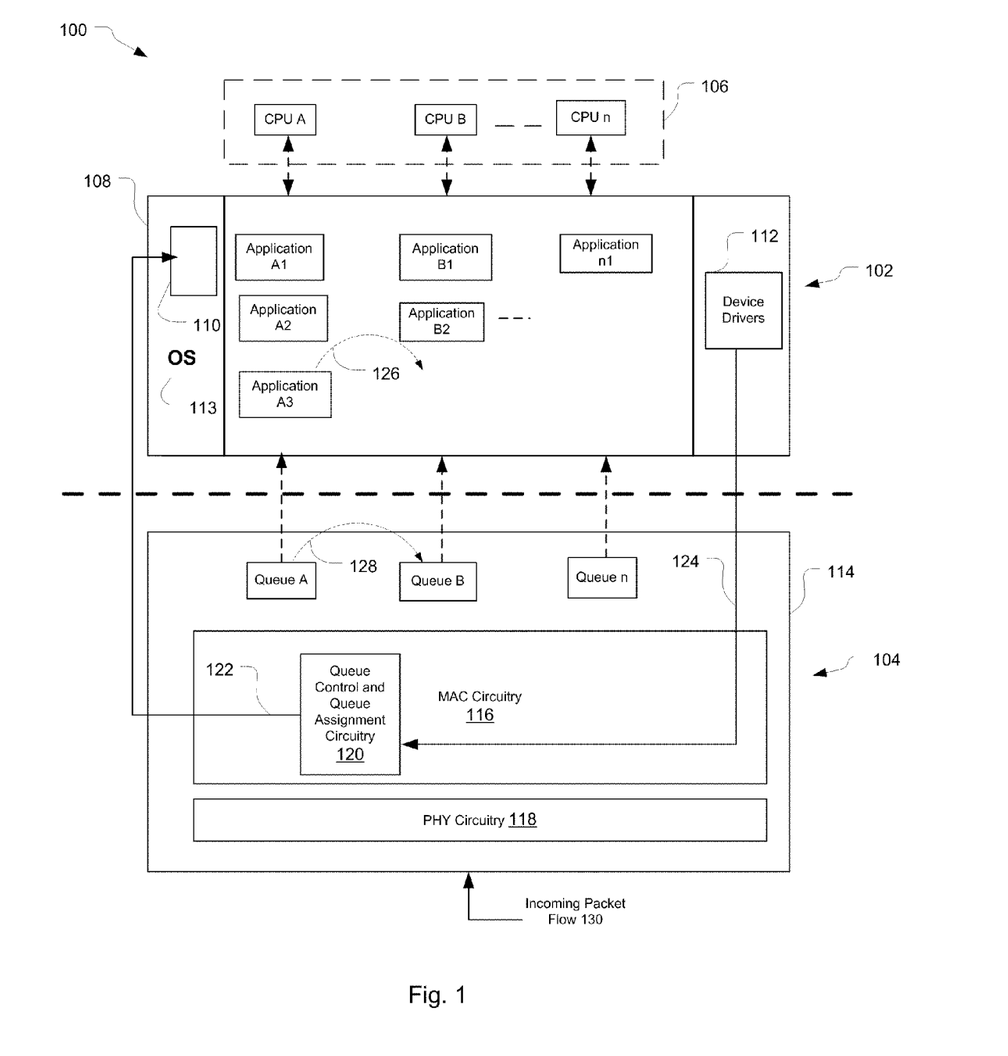
FIG. 1 illustrates one exemplary system embodiment consistent with the present disclosure.

FIG. 1 illustrates one exemplary system embodiment consistent with the present disclosure. System 100 of this embodiment generally includes a host system 102 and a network adapter 104 in communication with the host system 102. The host system 102 of this embodiment includes a host processor 106 and system memory 108. The host processor 106 may include at least one core processing unit (hereinafter "core"), generally labeled CPU A, CPU B, . . . , CPU n. A "core" may comprise a physical processing unit and may be a logical and/or physical subsection of processor 106. System memory 108 may host operating system code 113 (e.g., OS kernel code), network adapter device driver code 112, application load balancer (ALB) code 110, and a plurality of applications, generally labeled as Application A1, . . . , n1. Device driver 112, when executed, is configured to control, at least in part, the operation of the network adapter 104, as will be explained in greater detail below.

One or more applications can be assigned to each CPU core. For example, as depicted in FIG. 1, Application A1, A2 and A3 can be assigned to CPU A, meaning that CPU A has the primary responsibility for executing instructions and exchanging commands and data related to these applications. Similarly, Application B1 and B2 can be assigned to CPU B and Application n1 can be assigned to CPU n. It should be noted at the outset that at least one application running in system memory 108 may include a "network application," meaning that such an application involve receiving and/or sending packets from/to the network adaptor 104. Of course, other system applications, including non-network applications, may be running in system memory 108.

Application load balancer code 110 is configured to balance the plurality of applications residing in system memory 108 across the plurality of available CPU cores. Specifically, application load balancer 110 is configured to assign an application to a particular core for processing. Assignment of an application to a core may occur, for example, upon system initialization and may also be performed dynamically during operation of the system 100 and/or as one or more applications become invoked in memory 108. Application load balancer 110 may be configured to monitor the processing usage (e.g., memory access, computation cycles in use, cache usage, network traffic, etc.) and/or available processing capacity of each core to determine available processing capacity on a core-by-core basis. Application load balancer code 110 may then distribute applications across the cores in an effort to balance the load across all of the available cores in the system.

Network adapter 104 may comprise a network interface card (NIC) 114 that generally includes media access control (MAC) circuitry 116 and physical interface (PHY) circuitry 118. MAC circuitry 116 may be configured to assemble data to be transmitted into packets, that include destination and source addresses along with network control information and error detection hash values. PHY circuitry 118 may include encoding and decoding circuitry (not shown) to encode and decode data packets. NIC 114 may be coupled to a medium to receive one or more packet flows, as indicated by packet flow 130. NIC 114 may also include a plurality of receive queues, labeled Queue A, Queue B, . . . , Queue n. Receive queues Queue A, Queue B, . . . , Queue n are configured to reference packets associated with a particular application received by the NIC 114 (via incoming packet flow 130).

MAC circuitry 116 may include queue control and queue assignment circuitry 120 configured to assign each receive queue to a particular packet flow associated with a network application in the host system. Circuitry 120 is also configured to move packet flow data into an assigned queue, either directly or after additional processing (e.g., after security processing using IPSec or LinkSec protocols). In operation, device drivers 112 may exchange commands and data with circuitry 120 to control the certain operations of circuitry 120. For example, device drivers 112 can control circuitry 120 to assign Queue A to the packet flows for Applications A1, A2 and A3 (which are assigned to CPU A by application load balancer 110). Similarly, Queue B . . . Queue n can be assigned to respective packet flows for respective applications, as indicated in FIG. 1.

In addition, circuitry 120 is configured to establish at least one threshold for at least one receive queue. For example, a ceiling threshold may be established for at least one queue, defining a point above which the queue is in danger of an overload condition. In operation, device drivers 112 may be configured to communicate with circuitry 120 (via communication path 124) to establish queue thresholds. A threshold, as used herein, is a percentage (or range) of overall queue packet flow level capacity. A ceiling (high) threshold is used herein to provide an alert mechanism that queue capacity is about to be exceeded, which may result in packet loss and/or inefficient packet throughput. A high threshold may be defined so that, if exceeded, the system has time to react and change the queue for the packet flow before the queue becomes overloaded. Of course, a ceiling threshold may be provided for each receive queue, and in other embodiments a ceiling and a floor threshold may be generated for each queue, as will be explained in greater detail below.

Circuitry 120 may be further configured to monitor one more queues to determine the packet flow level in a queue and compare the packet flow level to a high threshold defined for that queue. If the high threshold is exceeded, this may be indicative of an impending queue overload. A queue overload can be a result of, for example, bandwidth reduction of the corresponding CPU core (e.g., the core is too busy to empty the queue efficiently), too many network applications are assigned to one queue resulting in too many packet flows on the queue, or burst traffic (e.g., as may result from security offloading by the MAC) overruns the queue. If packet flow in a queue exceeds the high threshold, circuitry 120 is further configured to generate a queue status message indicative of the status of the queue. In this case, the queue status message may include information of an impending queue overload condition. Circuitry 120 may also be configured to forward, via communication path 122, the queue status message to the operating system 113 (and, more specifically, to application load balancer 110).

The queue status message may cause the application load balancer 110 to migrate one or more applications to another core, which will, in turn, move the packet flow from one queue to another queue. Thus, for example, as depicted in FIG. 1 and assuming that the packet flow of Queue A has been identified as exceeding a threshold, circuitry 120 may provide a message to load balancer 110, which, in turn may reassign Application A3 to CPU B, indicated by migration path 126. Device drivers 112 may control circuitry 120 (via communication path 124) to reassign packet flows to a new queue. As a result, circuitry 120 may reassign packet flows associated with Application A3 to Queue B, as indicated by migration path 128.

Figure 2:
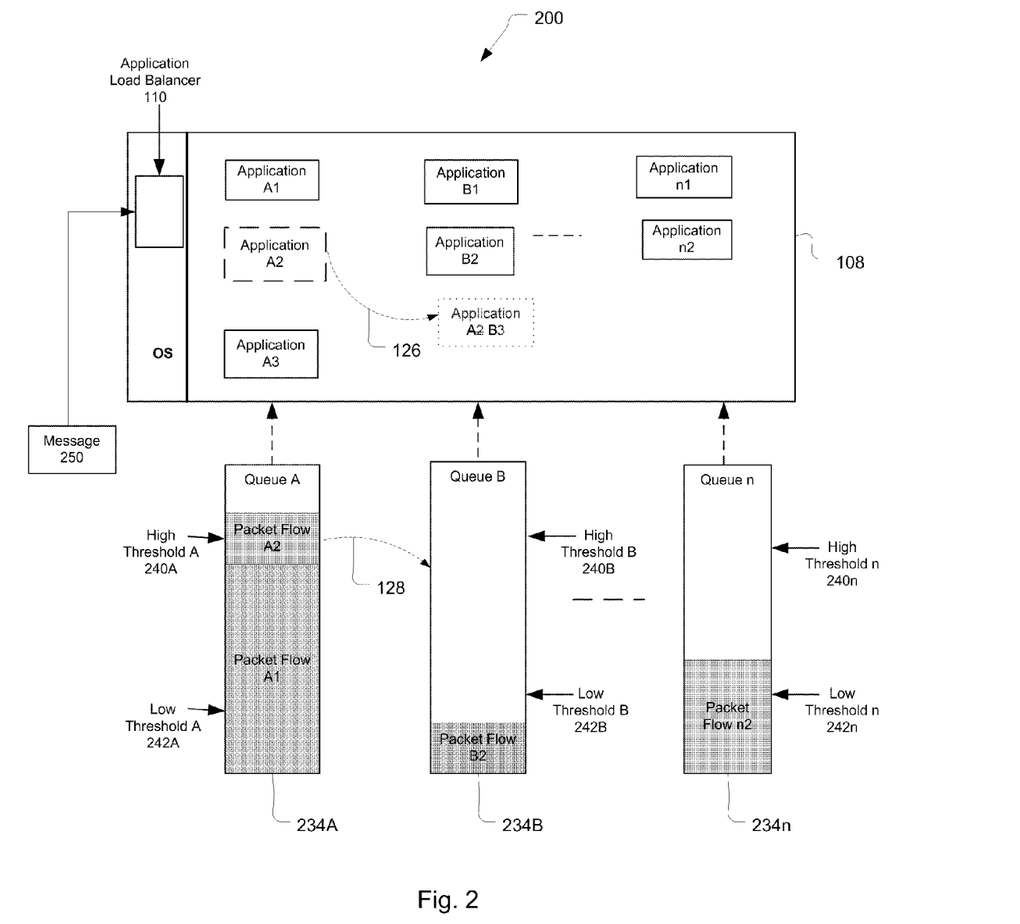
FIG. 2 illustrates another exemplary system embodiment consistent with the present disclosure.

FIG. 2 illustrates another system embodiment 200 consistent with the present disclosure. In general, this embodiment illustrates the receive queues (Queue A, Queue B, . . . , Queue n) in more detail. In FIG. 2, certain portions of the system 100 depicted in FIG. 1 have been omitted for clarity (for example, CPU 106, MAC circuitry 116 and PHY circuitry 118), but it is to be understood that like parts of FIG. 2 can be implemented in a manner consistent with an embodiment depicted in FIG. 1, or alternatively in other system implementations, without departing from this embodiment.

As shown in FIG. 2, Queue A includes packet flows A1 and A2 associated with applications A1 and A2, respectively. Queue B includes packet flow B2 associated with application B2, and Queue n includes packet flow n2 associated with application n2. Each queue may have a configurable low threshold (or floor threshold) level 242A, 242B, . . . , and 242n. The low threshold value may be defined, for example, based on expected packet flow for the applications assigned to the particular queue, and/or the low threshold value may be set within a certain range, e.g., 10-20% of the maximum queue capacity and/or other user-programmable values or ranges. When the capacity of a queue falls below the low threshold, this may be an indication that the particular queue has additional capacity available to accept addition packet flows (via a network application assignment to that queue). Each queue may have a configurable high threshold (or ceiling threshold) level 240A, 240B, . . . , and 240n. When the packet traffic level of a queue rises above the high threshold of the queue, the traffic level of the queue may be approaching a queue overload condition.

As an example, FIG. 2 depicts the traffic level in Queue A surpassing high threshold A 240A, indicating an excess of traffic on Queue A. FIG. 2 also depicts the traffic in queue B falling below low threshold B 242B, indicating capacity for additional traffic on queue B. Queue status message 250 may be generated indicating, at least, that the high threshold 240A in Queue A is exceeded. Such a message 250 may be forwarded to the application load balancer 110. In response thereto, the application load balancer 110 may cause a migration of one or more of the applications away from the current core assignment by assigning one or more applications to at least one other core. Thus, in this example, Application A1, A2 and/or A3 may be moved from CPU A to another core.

While the forgoing represents one example of a queue status message 250 indicative of an exceeded high threshold in one or more queues, the message 250 of this embodiment may also include additional information regarding the capacity of other queues. In the example of FIG. 2, the packet flow in Queue B (as a result of packet flow related to Application B2) is below the low threshold 242B, while the high threshold 240A of Queue A is exceeded. Message 250 may be generated to indicate that the packet flow in Queue A has exceeded the high threshold 240A and the packet flow in Queue B is below the low threshold 242B. Such a message 250 may be forwarded to the application load balancer 110. In response thereto, the application load balancer 110 may cause a migration of one or more of the applications away from the current core assignment to a different core. Thus, in this example, Application A2 to be moved away from CPU A and assigned to CPU B, since Queue B (assigned to CPU B a priori, as discussed above) is indicated as having available capacity. This is depicted graphically in FIG. 2 as migration path 126 where Application A2 is re-assigned to CPU B as Application B3. Of course, packet flows associated with Application B3 may now be assigned to Queue B, as indicated by migration path 128. Thus, queue status message 250 may include information related to the capacity of one or more queues relative to the high threshold and/or the low threshold assigned to that queue.

Figure 3:
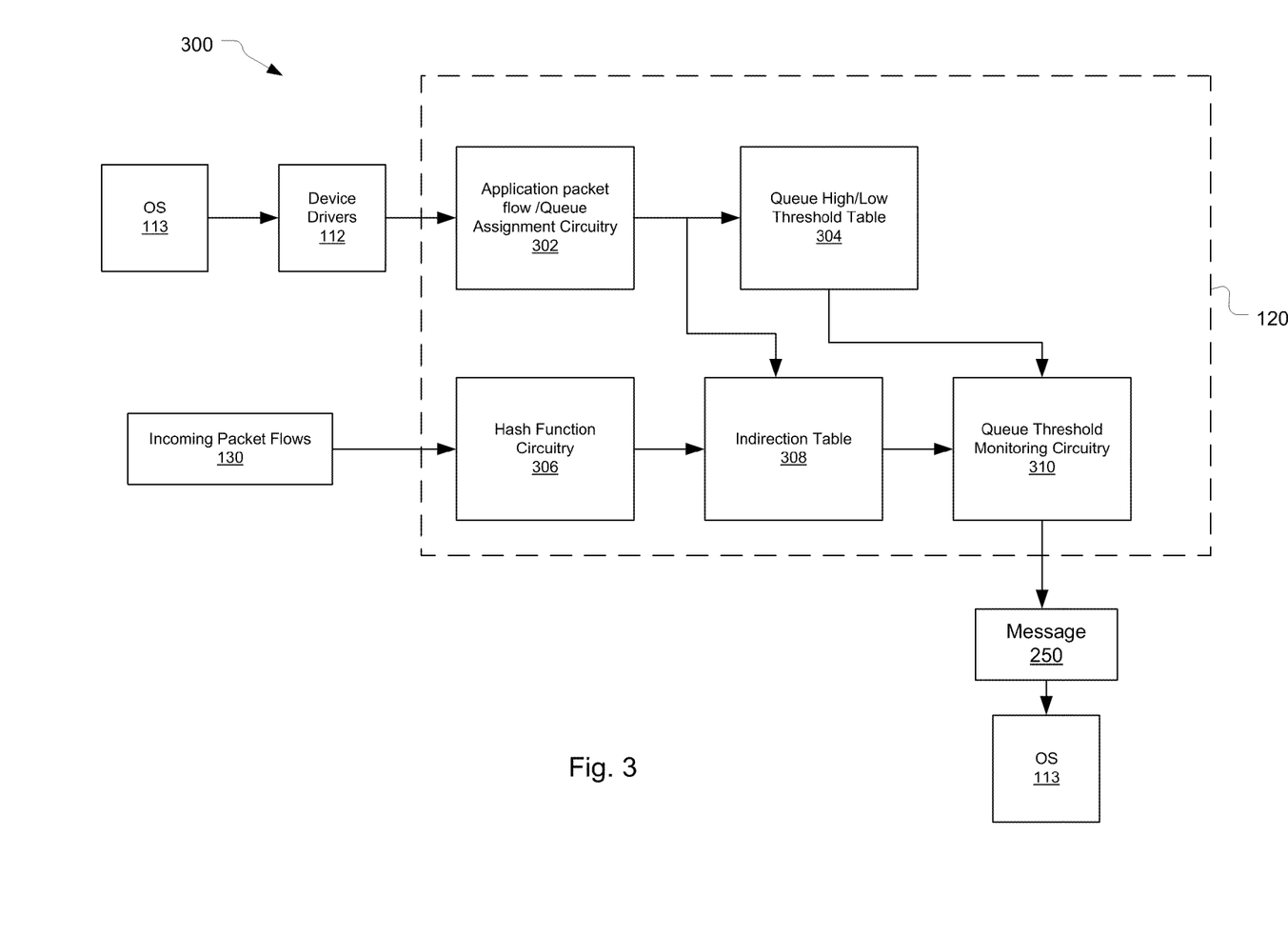
FIG. 3 illustrates a functional block diagram of one exemplary embodiment of queue control and queue assignment circuitry consistent with the present disclosure.

FIG. 3 depicts a functional block diagram 300 of one exemplary embodiment of queue control and queue assignment circuitry 120 consistent with the present disclosure. In FIG. 3, certain portions of the system 100 depicted in FIG. 1 have been omitted for clarity (for example, CPU 106, system memory 108, MAC circuitry 116 and PHY circuitry 118), but it is to be understood that like parts of FIG. 3 can be implemented in a manner consistent with an embodiment depicted in FIG. 1 or 2, or alternatively in other system implementations, without departing from this embodiment. In this embodiment, circuitry 120 includes application packet flow/queue assignment circuitry 302, a queue floor/ceiling threshold table 304, hash function circuitry 306, an indirection table 308, and queue threshold monitoring circuitry 310.

Circuitry 302 is configured to assign at least one application packet flow to a respective receive queue. To that end, device driver 112 (as shown in FIG. 1) may be used to exchange commands and data with circuitry 120 (including circuitry 302) to assign particular queues to particular packet flows. An application (not shown in this Figure) may already be assigned to a particular CPU core, as described above. Thus, once a packet flow associated with the application is assigned to a receive queue by circuitry 302, a queue/core pair may be created for packets associated with an application. The queue/core pair related to an application packet flow may be used to populate an indirection table 308, as will be described in greater detail below.

In addition, circuitry 302, either directly or in response to commands from device drivers 112, may generate a queue high and/or low threshold table 304. Table 304 may include floor (low) and/or ceiling (high) threshold values for at least one receive queue that has been assigned an application packet flow by circuitry 302. In one embodiment, as described with reference to FIG. 2, each receive queue is assigned a low threshold and a high threshold. The low threshold is a value below which is indicative of extra available packet flow capacity on the queue, and the high threshold is a value above which is indicative of an impending queue overload condition. Each receive queue may be assigned unique low/high threshold values, or, alternatively, all of the receive queues may be assigned the same low and high threshold values.

Hash function circuitry 306 may include packet filters operable to identify a packet flow with a particular application. In operation, circuitry 306 may parse an incoming packet flow to obtain flow identity ("ID") information. Normally, a packet flow includes one or more fields that permit identification. For example, the packet flow ID for a TCP packet may include a sequence of source IP address, destination IP address, source port number, and destination port number, L2/L4 data, etc., any of which can be utilized by circuitry 306 to ID the packet flow. Of course, circuitry 306 may be configured to ID other packet protocols, e.g., using UDP packet information.

Figure 4:
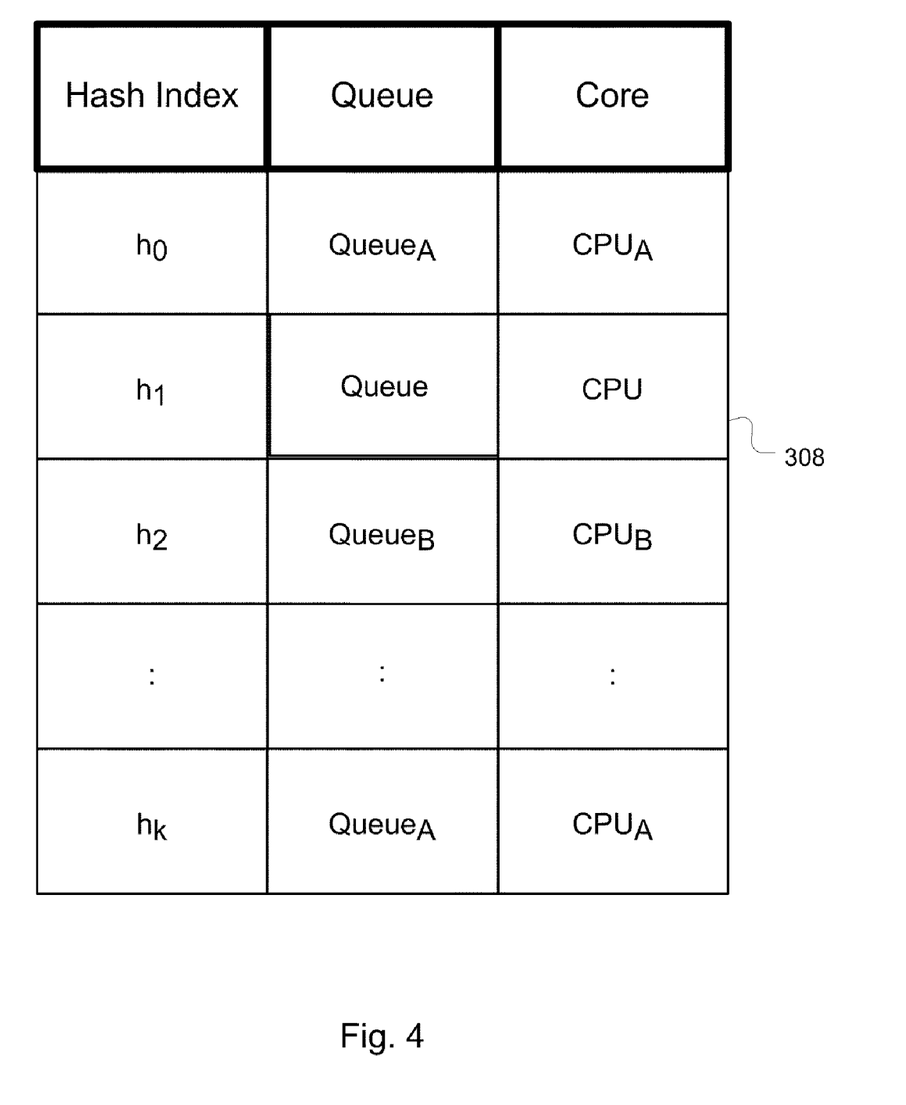
FIG. 4 illustrates one embodiment of indirection table consistent with the present disclosure.

Circuitry 306 may be configured to generate a hash value $h_n$ related to the packet flow ID. The hash result $h_n$ may correspond to one of entries in the indirection table 308. Based on the hash result h, indirection table 308 returns the identity information of a core and receive queue associated with the incoming packet flow. Once the appropriate queue is known (using table 308), packets associated with that application may be buffered into the appropriate receive queue and/or forwarded to other processing circuitry, for example, security offloading circuitry (not shown). FIG. 4 depicts one embodiment of indirection table 308 consistent with the present disclosure. Each row of indirection table 308 may represent the association of a queue, a CPU or core, and a packet flow 130, as represented by a hash index (h). As stated, circuitry 306 is configured to receive an incoming packet flow, parse the packet flow to determine the packet flow identifier and look up the hash index assigned to the packet flow. The hash index (h) may be used to reference a row in the indirection table 308, to determine the receive queue and core assigned to that packet flow.

Queue threshold monitoring circuitry 310 is configured to monitor at least one receive queue and compare the capacity in the receive queue to the threshold values established in table 304 for that queue. For example, if both high and low thresholds are established for a given queue in table 304, circuitry 310 may compare the current queue traffic level to the low and high thresholds to determine whether the queue is currently overloaded (high threshold exceeded) or has available capacity (below the low threshold). If any of the thresholds are exceeded, queue threshold monitoring circuitry 310 may generate status message 250. Message 250 may include information to identify the queue that has exceeded a high threshold and the queue that has current capacity below the low threshold. As described above, such a message may be interpreted by the host system OS to reassign at least one application away from an overloaded queue, and possibly toward a queue that has available capacity. Circuitry 310 may be configured to communicate the queue status message to the OS 113, using, for example an in-band message protocol or an out-of-band (OOB) message protocol.

In order to prevent "false alarms" of an overloaded queue, circuitry 310 may include a time-out mechanism (e.g., timer circuitry, latch circuitry, debounce circuitry, etc., not shown) that is permitted to lapse before any message is sent to the OS. Thus, for example, in a "bursty" environment, the high threshold may momentarily be exceeded (with remaining capacity in the queue), but may settle below the threshold once the packets are timely moved out of the queue. Before circuitry 310 generates a message, circuitry 310 may wait until a predetermined time-out period has lapsed. The time out period may be selected, for example, based on the overall traffic flow of the queue and/or other criteria which may be evident to one of ordinary skill in the art.

Exemplary Methodology

Figure 5:
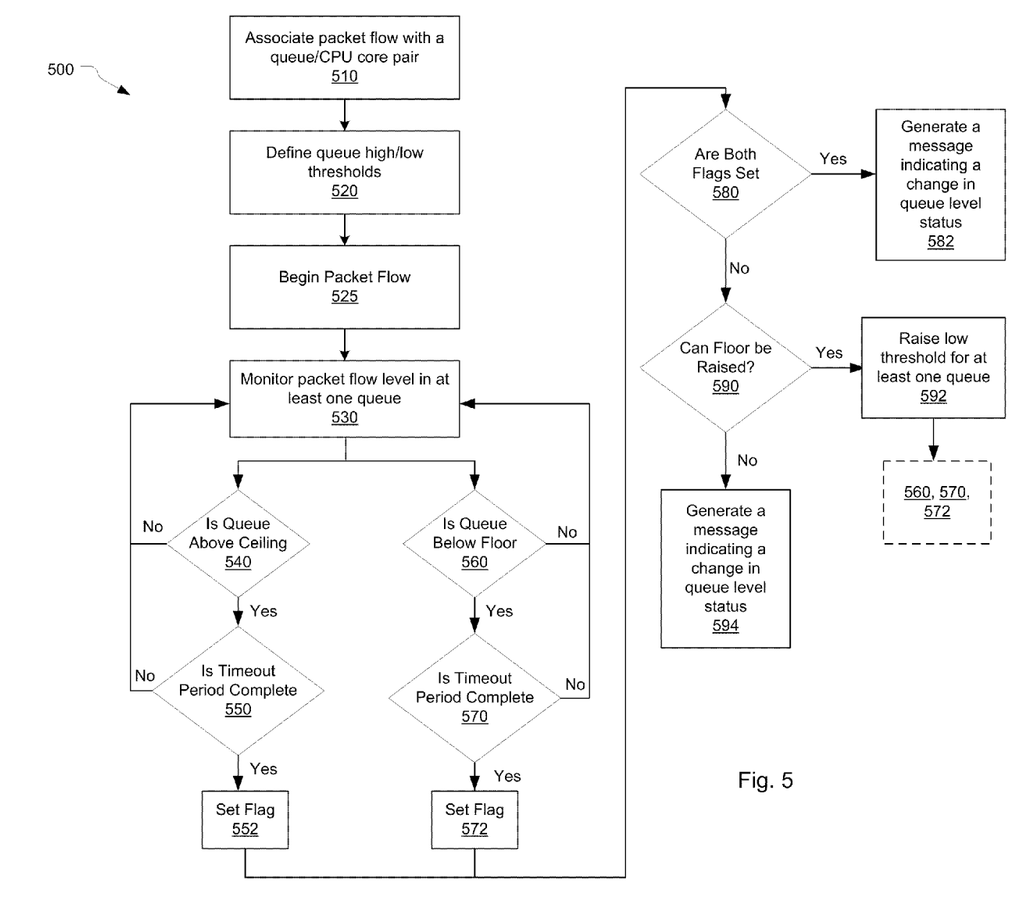
FIG. 5 illustrates a flowchart of exemplary operations consistent with the present disclosure.

FIG. 5 illustrates a flowchart 500 of exemplary operations consistent with the present disclosure. The operations illustrated in this embodiment may be performed by circuitry and/or software modules associated with a network adaptor (e.g., adapter 104 depicted in FIG. 1), or such operations may be performed by circuitry and/or software modules associated with a host system (or other components), or a combination thereof. Operations of this embodiment include associating a packet flow with a queue/CPU core pair 510. At operation 520 of this embodiment, receive queue high (ceiling) and/or low (floor) thresholds may be defined. The queue thresholds may be generally defined as a percentage and/or range of the capacity of the queue. At operation 525, packet flow begins. Additional operations may include monitoring the packet flow levels in at least one queue 530. If a high threshold is defined for at least one queue, but no low thresholds are defined, operations according to this embodiment include determining if a queue capacity is above the ceiling threshold 540, and if so, determining if the queue capacity has exceeded the high threshold for longer than a timeout period 550.

If the timeout period is complete 550, a flag may be set 552, indicating an impending queue overload condition, or, more generally, that the status of the queue has changed. If the flag is set 552, a queue status message may be generated indicating a change in queue level status 582. More specifically, in this example, the queue status message indicates an impending queue overload condition. The message can be forwarded to an operating system to enable, for example, a change in the associated packet flow/core assignment. In this embodiment, the queue threshold status message may be communicated to the OS using, for example, a bus signal, an interrupt, a mailbox, semaphore, and/or passive polling of registers by the host system.

Where a plurality of queues are monitored and both a high and low threshold are defined for each queue, operations of this embodiment may also include determining if a queue capacity is below the floor threshold 560, and if so, determining if the queue capacity has remained below the low threshold for longer than a timeout period 570. If the timeout period is complete 570, a flag may be set 572, indicating available capacity on a queue or that the status of the queue has changed. Operations may also include determining if both flags 552, 572 are set, and if so, a message is generated indicating a change in queue level status 582. Here, both flags being set mean that one queue indicates an overload condition, while another queue indicates available capacity. The message can be forwarded to an operating system to enable, for example, a change in the associated packet flow/core assignment away from the queue that is overloaded and into the queue that has capacity.

If the high threshold flag for one queue is set 552, but the floor threshold flag 572 remains unset for any queue, operations may further include determining if the low threshold in at least one queue can be raised 590. Other queues may have available capacity, but each of the other queues may have exceeded their respective low thresholds. Thus, raising the floor of other queues may enable identification of a queue that has additional capacity to receive additional packet flows. If the low threshold for at least one queue can be raised 592, operations 560 and 570 may be performed until the low threshold flag is set 572. Thus, the floor of at least one queue may be raised incrementally until the packet flow for that queue drops below the low threshold. If the floor threshold of at least one queue cannot be raised (590), a message may be generated indicating an impending queue overload condition, or that the status of the queue has changed 594. In this case, the message may include information related to an exceeded threshold for a queue, but does not include information regarding another queue having available capacity. The message can be forwarded to an operating system to enable, for example, a change in the packet flow/core assignment.

In this embodiment, the low threshold may be used to determine the queue that has the most available capacity (among the plurality of queues). Generating a queue status message having queue capacity information in terms of both high and low thresholds may enable the OS to migrate an application so that packets are routed to the best receive queue, by migrating an application to the core that matches a queue having the most available additional capacity. Also, if a queue status message has been forwarded to the hosts system and the queue status changes by packet flow falling below the high threshold, another queue status message may be forwarded to the host system to update the host on the status of the queue.

The operations described herein can reduce or eliminate "guesswork" on the part of the OS in terms of where to best move an application and which receive queue is best suited to begin receiving packet flows for an application. These operations can reduce or eliminate repetitive attempts to assign an application to a queue (which may result in "queue thrashing") which may otherwise occur if the OS does not have additional queue capacity information. For example, in the embodiment of FIG. 2, while both Queue B and Queue n are depicted as having additional capacity, Queue B may be a better choice to receive the packet flows from Application A2, since the capacity on Queue B is greater than Queue n and the capacity on Queue B is below the low threshold 242B, while the capacity on Queue n is above the low threshold 242n.

In this embodiment, the network adaptor may not affirmatively forward the queue status message to the host system, but may publish the queue level status message for the host system to periodically poll. In one embodiment, the network adaptor may publish the queue level status message in MAC registers, and make these registers available to the host system, for example, using the network adaptor device driver. In another embodiment, the network adaptor may write the queue level status message in a re-locatable data structure resident in host system memory, and the host system may communicate the location of this data structure to the network adaptor via the network adaptor device driver.

Figure 6:
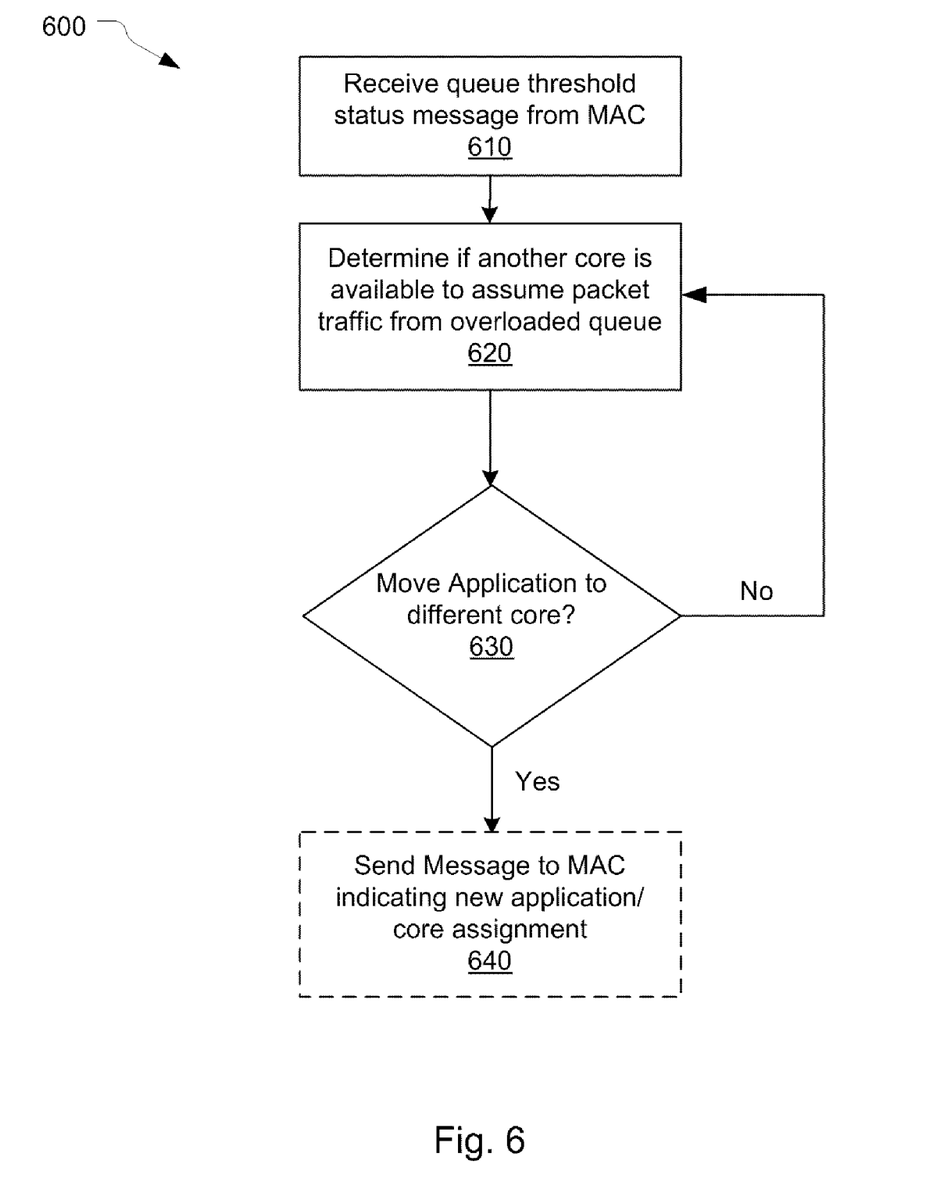
FIG. 6 illustrates another flowchart of exemplary operations consistent with the present disclosure.

FIG. 6 illustrates another flowchart 600 of exemplary operations consistent with the present disclosure. The operations illustrated in this embodiment may be performed by circuitry and/or software modules associated with a host system (e.g., OS 113 and application load balancer 110 of the host system 102 depicted in FIG. 1). Alternatively, operations of this embodiment may be performed by circuitry and/or software modules associated with a network adapter and/or other components), or a combination thereof. In this embodiment, it is assumed that a receive queue status message has been generated by a network adapter (e.g., MAC circuitry), for example, utilizing the operations of FIG. 5.

Operations according to this embodiment may include receiving a queue status message from a MAC 610. As described above, the queue status message may include information regarding a receive queue capacity or level of traffic referenced by the receive queue. The message may indicate a change in the condition in one or more receive queues, for example, (1) a high threshold indicator has been activated (2) a high threshold indicator has been deactivated, (3) a low threshold indicator has been activated, and (4) a low threshold indicator has been deactivated. If the queue threshold status message indicates that one or more queues are detecting traffic levels below the low thresholds and none of the high thresholds have been crossed, then no action may be taken. If the queue status message indicates that one or more receive queue high threshold flags have been set (indicative of an impending queue overload condition), operations of this embodiment may include determining if another core is available to assume the packet traffic of the overloaded queue 620. If a core is available, an application may be moved from an overloaded queue/core pair to the available core 630, thus creating a new application/core pairing. Operations according to this embodiment may also include sending a message to the MAC indicating the new packet flow/core assignment 640.

While the foregoing has assumed that a network application may be moved from one core to a different core, it is also contemplated herein that non-network applications may be moved away from one core to another core. For example, an application load balancer, in response to the queue status message from the network adapter, may determine that an overloaded queue is a result of an overloaded core. Instead of migrating network applications away from that core, the application load balancer may instead identify non-network applications associated with the core and move one or more of these non-network applications to another core.

In an embodiment where the status message indicates that a receive queue is overburdened with traffic, but no other receive queue currently has capacity available to accept traffic, the application load balancer may adjust the low threshold level settings of one or more receive queues, as described above with reference to FIG. 5. Once a receive queue is found to have adequate space to begin receiving packet flow from an application, the application may be moved to that core.

If an application is moved to another core, a message may be sent to the MAC circuitry indicating a new application/core assignment 640. When the MAC receives the message of the new application/core assignment, there may be a window of time where portions of packet flows to be processed by the migrated application may still be remaining in the receive queue associated with the former core of the migrated application. The MAC may therefore modify a queue handler of the former queue to forward existing packets to the new queue. Alternatively, packets in the old queue may be discarded (for example, by freeing the memory allocated to the received packets) and the MAC may send a request to the link partner requesting retransmission of the dropped packets. from the transmitting application.

Figure 7:
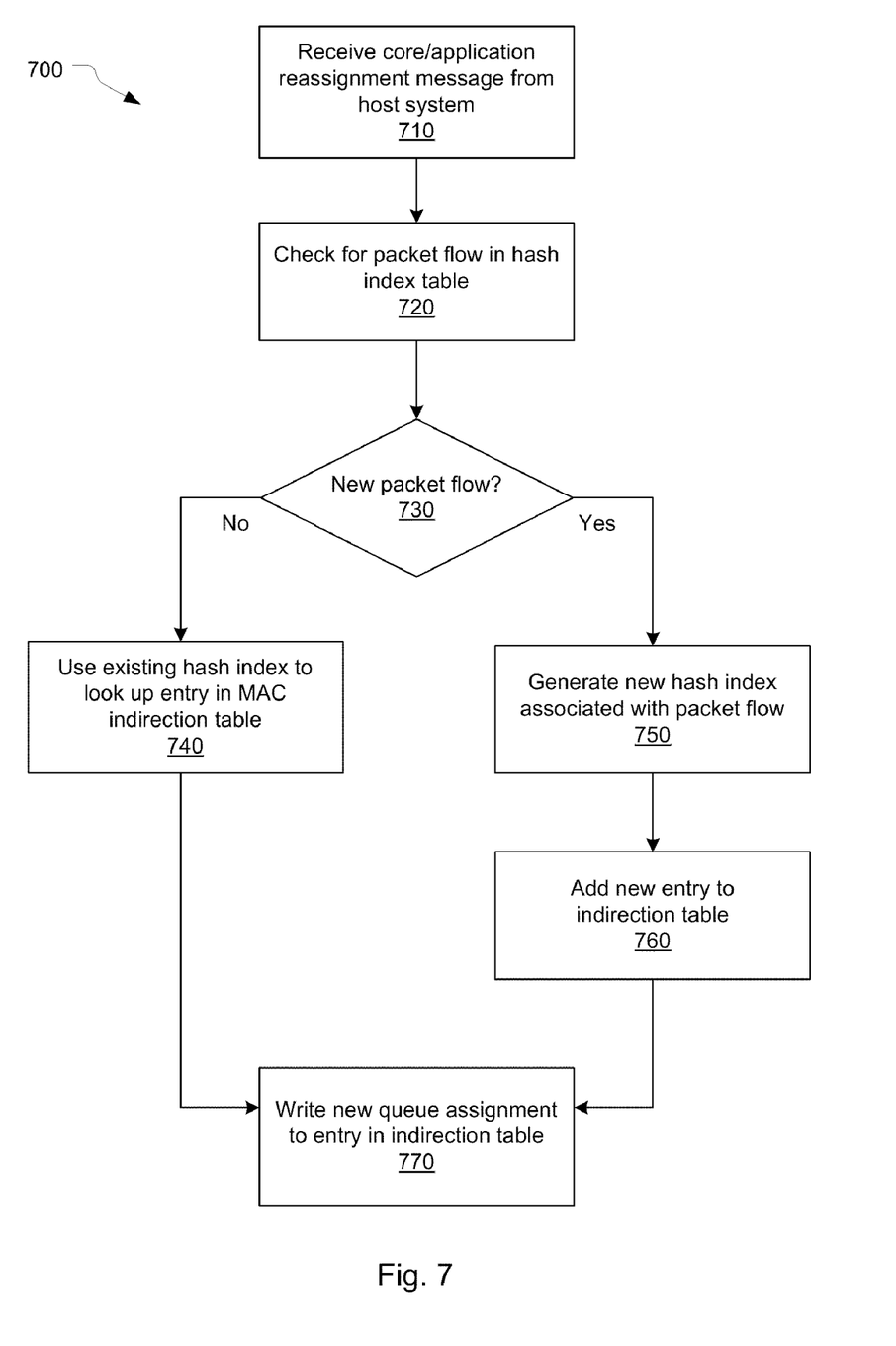
FIG. 7 illustrates another flowchart of exemplary operations consistent with the present disclosure.

FIG. 7 illustrates another flowchart 700 of exemplary operations consistent with the present disclosure. The operations illustrated in this embodiment may be performed by circuitry and/or software modules associated with a network adaptor (e.g., adapter 104 depicted in FIG. 1), or such operations may be performed by circuitry and/or software modules associated with a host system (or other components), or a combination thereof. In this embodiment, it is assumed that a network application has received a new core assignment, for example, utilizing the operations of FIG. 6.

A new application/core pair assignment may be received by a network adapter 710. As described above, a host system (e.g., device drivers) may control MAC circuitry to establish a new application packet flow/queue assignment. The network adaptor may then determine whether or not this packet flow is currently being serviced by the network adaptor by checking if the packet flow identifier has been registered by the network adaptor. For example, the network adapter may check if the packet flow is associated with a hash index in a hash index table 720. If the packet flow is currently registered with the network adaptor, meaning the packet flow is not new 730, the network adaptor may then use the hash index to look up an entry in an indirection table 740. If the packet flow is not currently registered with the network adaptor, meaning a new packet flow 730, a new hash index may be generated to associate the new queue assignment with the packet flow 750. For example, the hash index may add a new entry to the first available row of a MAC indirection table 760. Whether the indirection table entry previously existed, or has been created to accommodate a new packet flow, the queue and core associated with the packet flow may be written to a corresponding entry in the indirection table 770.

While the foregoing is prided as exemplary system architectures and methodologies, modifications to the present disclosure are possible. For example, operating system 113 may manage system resources and control tasks that are run on system 102. For example, OS 113 may be implemented using Microsoft Windows, HP-UX, Linux, or UNIX, although other operating systems may be used. When a Microsoft Windows operating system is used, the ndis.sys driver may be utilized at least by device driver 113 and an intermediate driver (not shown). For example, the ndis.sys driver may be utilized to define application programming interfaces (APIs) that can be used for transferring packets between layers. In one embodiment, OS 113 shown in FIG. 1 may be replaced by a virtual machine which may provide a layer of abstraction for underlying hardware to various operating systems running on one or more processors.

Operating system 113 may implement one or more protocol stacks (not shown). A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine.

Other modifications are possible. For example, memory 108 and/or memory associated with the network adaptor 104 (not shown) may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 108 and/or memory associated with the network adaptor 104 (not shown) may comprise other and/or later-developed types of computer-readable memory.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor of FIG. 1) and/or programmable circuitry such as the MAC circuitry. Thus, it is intended that operations according to the methods described herein may be distributed across a plurality of physical devices, such as processing structures at several different physical locations. Of course, the operations described herein as attributable to the host system and the network adapter could be performed by a storage medium, on one or the other, having instructions that when executed by one or more processors perform the methods. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The Ethernet communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

As used herein, a "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. PHY circuitry 224 may comply or be compatible with, the aforementioned IEEE 802.3 Ethernet communications protocol, which may include, for example, 100BASE-TX, 100BASE-T, 10 GBASE-T, 10 GBASE-KR, 10 GBASE-KX4/XAUI, 40 GbE and or 100 GbE compliant PHY circuitry, and/or PHY circuitry that is compliant with an after-developed communications protocol.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method, comprising:

assigning a network application to at least one first core processing unit, from among a plurality of core processing units;

assigning a first receive queue to said first core processing unit, wherein the first receive queue is configured to receive packet flow associated with the network application;

defining a high threshold for the first receive queue, said high threshold defining a point above which said first receive queue is at risk of an overload condition;

monitoring the packet flow in the first receive queue and comparing a packet flow level in the first receive queue to the high threshold; wherein if the packet flow level exceeds the threshold based on the comparing, generating a queue status message indicating that the packet flow level in the first queue has exceeded the queue high threshold;

defining a low threshold for at least a second receive queue, the low threshold being a percentage of the overall capacity of the second receive queue and below the high threshold; and monitoring a packet flow of the second receive queue and comparing a packet flow level of the second receive queue to the low threshold; wherein if the packet flow level in the second receive queue falls below the low threshold, generating the status message that further indicates that the packet flow level in the second queue is below the low threshold;

wherein if the packet flow level in the second queue remains above the low threshold, adjusting the low threshold incrementally upward a predetermined amount or until the low threshold is above the packet flow level in the second queue.

2. The method of claim 1, further comprising:

generating, in response to the queue status message, a new core assignment to assign the network application to a second core processing unit;

generating a core/application message indicating the new assignment of the network application to the second core; and assigning, in response to the new core/application assignment message, the packet flow associated with the network application to a second receive queue.

3. The method of claim 2, further comprising:

moving packet information from the first receive queue to the second receive queue.

4. The method of claim 1, further comprising:

waiting, before the queue status message is generated, for a predetermined time out period to lapse.

5. A system comprising, one or more non-transitory storage mediums having stored thereon, individually or in combination, instructions that when executed by one or more processors result in the following operations comprising:

assigning a first receive queue, from among a plurality of receive queues, to a packet flow, wherein the packet flow is associated with a network application, and wherein the network application is assigned to a first core processing unit, from among a plurality of core processing units;

defining a high threshold for the first receive queue, said high threshold defining a point above which said first receive queue is at risk of an overload condition;

monitoring the packet flow in the first receive queue and comparing a packet flow level in the first receive queue to the high threshold; wherein if the packet flow level exceeds the threshold based on the comparing, generating a queue status message indicating that the packet flow level in the first queue has exceeded the queue high threshold;

defining a low threshold for at least a second receive queue, the low threshold being a percentage of the overall capacity of the second receive queue and below the high threshold; and monitoring a packet flow of the second receive queue and comparing a packet flow level of the second receive queue to the low threshold; wherein if the packet flow level in the second receive queue falls below the low threshold, generating the status message that further indicates that the packet flow level in the second queue is below the low threshold;

wherein if the packet flow level in the second queue remains above the low threshold, adjusting the low threshold incrementally upward a predetermined amount or until the low threshold is above the packet flow level in the second queue.

6. The system of claim 5, wherein the instructions that when executed by one or more of the processors result in the following additional operations comprising:

generating, in response to the queue status message, a new core assignment to assign the network application to a second core processing unit;

generating a core/application message indicating the new assignment of the network application to the second core; and assigning, in response to the new core/application assignment message, the packet flow associated with the network application to a second receive queue.

7. The system of claim 6, wherein the instructions that when executed by one or more of the processors result in the following additional operations comprising:

moving packet information from the first receive queue to the second receive queue.

8. The system of claim 5, wherein the instructions that when executed by one or more of the processors result in the following additional operations comprising:

waiting, before the queue status message is generated, for a predetermined time out period to lapse.

9. A network adapter, comprising:

media access control (MAC) circuitry and a plurality of receive queues, the MAC circuitry is configured to:

assign a first receive queue, from among a plurality of receive queues, to a packet flow, wherein the packet flow is associated with a network application, and wherein the network application is assigned to a first core processing unit, from among a plurality of core processing units in a host system;

define a high threshold for the first receive queue, said high threshold defining a point above which said first receive queue is at risk of an overload condition;

monitor the packet flow in the first receive queue;

compare a packet flow level in the first receive queue to the high threshold; wherein if the packet flow level exceeds the threshold based on the comparing, the MAC circuitry is further configured to generate a queue status message indicating that the packet flow level in the first queue has exceeded the queue high threshold;

define a low threshold for at least a second receive queue, the low threshold being a percentage of the overall capacity of the second receive queue and below the high threshold; and monitor a packet flow of the second receive queue and comparing a packet flow level of the second receive queue to the low threshold; wherein if the packet flow level in the second receive queue falls below the low threshold, generating the status message that further indicates that the packet flow level in the second queue is below the low threshold;

wherein if the packet flow level in the second queue remains above the low threshold, said MAC circuitry is further configured to adjust the low threshold incrementally upward a predetermined amount or until the low threshold is above the packet flow level in the second queue.

10. The network adapter of claim 9, wherein the MAC circuitry is further configured to:

receive from the host system, in response to the queue status message, a new core/application assignment message indicating that the network application is assigned to a second core processing unit; and assign, in response to the new core/application assignment message, the packet flow associated with the network application to a second receive queue.

11. The network adapter of claim 10, wherein the MAC circuitry is further configured to:

move packet information from the first receive queue to the second receive queue.

12. The network adapter of claim 9, wherein the MAC circuitry is further configured to:

wait, before the queue status message is generated, for a predetermined time out period to lapse; and forward the queue status message to the host system after the time out period has lapsed.

\* \* \* \* \*